Sept. 7, 1965  J. M. HERRINGTON, SR  3,204,252
GLARE-ELIMINATING STRUCTURE
Filed Oct. 21, 1964

INVENTOR
JEFF M. HERRINGTON, SR.

BY Burns, Doane, Benedict,
Swecker & Mathis
ATTORNEYS

United States Patent Office 3,204,252
Patented Sept. 7, 1965

3,204,252
GLARE-ELIMINATING STRUCTURE
Jeff M. Herrington, Sr., 1724 E. Brainard St.,
Pensacola, Fla.
Filed Oct. 21, 1964, Ser. No. 405,335
7 Claims. (Cl. 2—13)

The present invention relates to an adjustable glare-eliminating structure which may be positioned upon a temple-bar of conventional eyeglass frames. More particularly, the invention relates to an improved non-glare shield for attachment to a temple-bar of eyeglass frames which may be economically manufactured while being capable of performing satisfactory service.

Shields and visors of various types designed to be used in conjunction with ordinary eyeglass frames have long been known. Some shields, such as that disclosed in United States Patent No. 2,858,539 to Carlson, are useful to eliminate the unpleasant glare created by light rays directed at the side of the face.

Most sunglasses fail to provide protection to the eyes from a light source located generally to the side. It is therefore advantageous for a person who spends even occasional extended periods of time out-of-doors, especially a person who remains out-of-doors at a relatively fixed location, to be provided with an efficient shielding device to avoid the glare from a light source, such as the rising or setting sun. Without such a shielding device one is likely left with the less satisfactory technique of shading the eyes with the hand or with an object held in the hand. Shields which block light rays directed at the side of the face may be particularly useful to spectators at out-of-doors sporting events, such as baseball or football games. Farmers, gardeners, tourists, boating enthusiasts, fisherman, hunters, hikers, golfers, as well as sun bathers, etc. can use such a glare-eliminating structure to good advantage. Glare-shields may also be used under some circumstances indoors when protection to the eyes is desired from an artificial light source.

It is an object of the invention to provide an improved glare-eliminating structure which may be economically constructed while capable of performing satisfactory service.

It is an object of the invention to provide an improved glare-eliminating structure which is capable of being securely attached to a temple-bar of a conventional eyeglass frame which may be of any one of a large variety of configurations.

It is a further object of the invention to provide an improved compact glare-eliminating structure of simple construction which is capable of being adjustably positioned upon a temple-bar of conventional eyeglass frames and of eliminating glare from a light source directed to the side of the face.

These and other objects of the invention, as well as the nature, scope, and utilization of the invention will be furthere apparent from the drawings and the following detailed description.

It has now been discovered that a glare-eliminating structure capable of adjustable engagement with a temple-bar of a conventional eyeglass frame may be economically constructed which comprises a shield member formed from a flexible or bendable opaque material, a flap member extending from the periphery of the shield member which is integrally connected thereto and folded to a position overlapping the shield member, the end portion of the flap member being secured to the shield member to form an aperture capable of receiving a temple-bar of eyeglass frames, and a slip-retarding resilient non-metallic body positioned within the aperture which is capable of engaging the temple-bar and maintaining the glare-eliminating structure at the desired location along the temple-bar.

Figure 1:
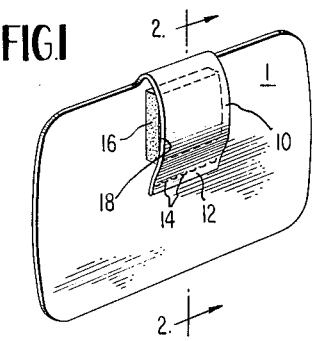
FIG. 1 is a perspective view of a preferred embodiment of a glare-eliminating structure according to the invention.
Figure 2:
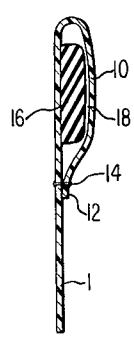
FIG. 2 is a sectional view taken along line 2—2 of FIG. 1.
Figure 3:
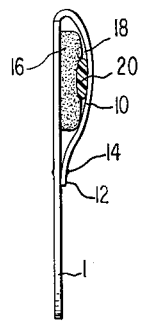
FIG. 3 is an end view of the device shown in FIG. 1, in which the structure is positioned upon a temple-bar of a conventional eyeglass frame shown in cross-sectional form.

With reference to the embodiment of FIGS. 1, 2, and 3 the shield member 1 may be formed from a sheet of any suitable flexible opaque material. For example, cellulose material such as heavy paper or cardboard may be used, as can flexible opaque sheets of various synthetic resins or plastics. The shield member is preferably of a symmetrical configuration such as a generally rectangular or oval shape. A generally rectangular shield member of about two by three inches has been found particularly satisfactory.

Extending from the periphery of the shield member 1 and integrally connected thereto a flap member 10 is provided. The flap member 10 is formed from the same sheet of material as the shield member 1 and may satisfactorily be of about one-half inch by about three-fourths of an inch in size. Both the flap member 10 and the shield member 1 may be cut from a sheet of raw material in a single cutting or stamping operation which may be accomplished by well known procedures in the cutting art. The flap member 10 is folded so that it overlaps the shield member 1, and the lower or end portion 12 of the flap member is secured to the shield member by any appropriate means, such as stitches 14. The lower portion 12 of the flap member may be fixedly secured to the shield member by numerous other means, such as by gluing or stapling. If a synthetic resin material is selected for the construction of the shield and flap members various solvents which are recognized as plastic cements may be employed. As further discussed hereafter, and illustrated in FIGS. 4, 5, 6 and 7 the flap member may also be resiliently secured to the shield member by a strip of rubber or rubber-like elastic material instead of being fixedly secured thereto as shown in FIGS. 1, 2 and 3.

Prior to securing the lower portion 12 of the flap member 10 to the shield member and the formation of aperture 18 thereby capable of receiving the temple-bar of eyeglass frames, a slip-retarding resilient body 16 is positioned on either the shield member 1, or the flap member 10, at a location so that it will assume a position within aperture 18 once the lower end 12 of the flap 10 is secured. As shown in FIGS. 1, 2, and 3, the resilient body 16 may be of a generally rectangular configuration which substantially fills aperture 18. The slip-retarding resilient body 16 may satisfactorily be formed from an essentially solid material, or filled with small pores as found in sponge rubber. One or more small cross-sections of resilient rubber tubing either whole or bisected longitudinally may satisfactorily serve as the resilient body. A cross-section of rubber tubing bearing a groove to accommodate a temple-bar may be used, but such a groove is not essential. Also, the resilient body may be placed in the aperture in such a manner that it is positioned on more than one side of the aperture, and may if desired line the entire inner surface of the aperture 18. It is preferred, however, to place a single resilient body 16 on the shield member as shown in FIGS. 1, 2 and 3, so that the flap member 10 of the device will not be caused to protrude an appreciable distance to the inside of the temple-bar, and thus eliminate the possibility of direct contact between the flap and the temple of the user. The resilient body 16 may be held in position by glue or any other suitable means.

FIG. 3 illustrates the glare-eliminating structure of FIGS. 1 and 2 when positioned upon temple-bar 20. The structure is easily placed upon the temple-bar of eyeglass frames by inserting the end of the temple-bar in aperture 18 so that the flap member 10 will be nearest the temple of the user, and sliding the structure along the bar until it reaches the desired position. The resilient body 16 enables the subsequent retention of the device at the desired location along the temple-bar. The aperture 18 is of such a configuration that it will accommodate conventional temple-bars of a large variety of configurations, ranging from thin metal bars to wide plastic bars. Once in position upon the temple-bar 20 the structure may be revolved about the temple-bar by the user without the necessity of removing the eyeglasses to a position so that the shielding member 1 is positioned essentially above the temple-bar. Such positioning may be desired when the device is temporarily not needed, or when it is desired to eliminate glare from a specific elevated location. When it is desired to no longer make use of the device it may also be easily removed by the user and carried in the pocket or purse until it is again needed. The shield member may be readily transferred from one temple-bar to the other as the need arises, or a user may wish to use a pair of the devices at a given time.

Figure 4:
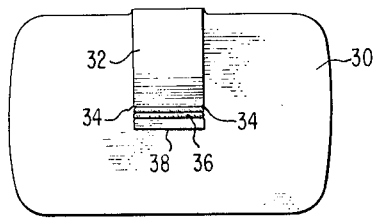
FIGS. 4 and 5 are side views from opposite sides of a particularly preferred embodiment of a glare-eliminating structure according to the invention in which a continuous strip of rubber is employed.
Figure 5:
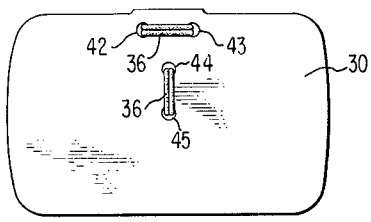
Figure 6:
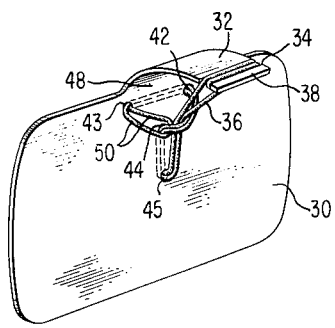
FIG. 6 is a perspective view of the embodiment of FIGS. 4 and 5 in which the flap member is shown in an open position so that the continuous strip of rubber may be clearly viewed.

The embodiment of the glare-eliminating structure of FIGS. 4, 5, 6 and 7 is particularly preferred for its ease of construction and quality of service. In this embodiment the shield member 30 and flap member 32 are formed in all respects as in the embodiment of FIGS. 1, 2, and 3. The shield member 30 is, however, provided with a series of small perforations, such as those exemplified in the drawing at 42, 43, 44 and 45. The flap member 32 may be further provided with small grooves or notches at locations where the elastic strip 36, described hereafter, is desired to engage the flap, such as grooves 34 at the lower portion of the flap member 32. The elastic strip 36 is preferably formed from a continuous strip of rubber, such as a conventional rubber-band of appropriate length, and is poistioned through the shield member 30 to engage the flap member 32 in such a manner that it may serve as a slip-retarding body within channel 48, and also as a means to resiliently secure the end portion 38 of the flap member 32 to shield member 30. As shown in FIG. 6, aperture 48 is formed by overlapping flap member 32 into which the temple-bar of conventional eyeglass frames may be inserted. The portion of the elastic strip 36 designated as 50, as well as its counterpart, serves as a resilient slip-retarding body within aperture 48. The fact that the end portion 38 of the flap member 32 is resiliently secured to the shield member 30 further facilitates ease when installing the glare-eliminating structure on a temple-bar.

Numerous other means for securing one or more continuous elastic strips to the shield member 30 and flap member 32 are possible and will be apparent to those skilled in the art. For instance, the number of perforations in the shield member 30 may be varied, one or more perforations may also be provided in the flap member 32 to accommodate the elastic strip, and the number of times the elastic strip is wound around flap member 32 may be increased so as to provide further slip-retarding means.

Figure 7:
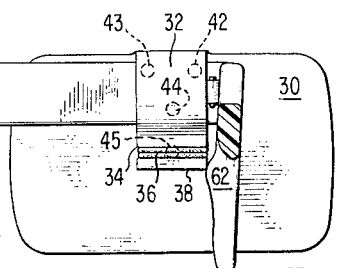
FIG. 7 is a side view of the embodiment of FIGS. 4, 5 and 6, shown in one of several possible positions upon the temple-bar of a conventional eyeglass frame.

In FIG. 7 the embodiment of FIGS. 4, 5 and 6 is shown positioned upon the temple-bar 60 of a conventional eyeglass frame. It will be noted that this embodiment, as well as the embodiment of FIGS. 1, 2 and 3 may be positioned so that the shield member 30 extends forward of the lens portion 62 in order to provide greater shielding to the eyes. It is also possible that the glare-eliminating structure be positioned on a temple-bar at an angle from the horizontal should such positioning be desired.

Structures formed according to the present invention bay be provided in a variety of pleasing colors. Due to the ready availability of the required materials and relative ease of construction afforded by the instant invention glare-eliminating structures may be economically produced, provided with a suitable advertising message, and distributed by businessmen to their potential customers. Since a single device will accommodate a wide variety of eyeglass frames no inventory problem is present, and the device is capable of efficiently serving nearly everyone who wears glasses.

Although the invention has been described with preferred embodiments, it is to be understood that variations and modifications may be resorted to as will be apparent to those skilled in the art. Such variations and modifications are to be considered within the purview and scope of the claims appended hereto.

I claim:

1. A glare-eliminating structure capable of adjustable engagement with a temple-bar of conventional eyeglass frames comprising a shield member formed from a flexible opaque material, a flap member extending from the periphery of said shield member which is integrally connected thereto and folded to a position overlapping said shield member, means for securing the end portion of said flap member to said shield member to form an aperture capable of receiving a temple-bar of eyeglass frames, and a slip-retarding resilient non-metallic body positioned within said aperture capable of engaging said temple-bar and maintaining said glare-eliminating structure at the desired position along said temple-bar, said slip-retarding body being resiliently yieldable both longitudinally and transversely of said temple-bar.

2. A glare-eliminating structure according to claim 1 wherein the flexible opaque material from which the shield member is formed is a cellulose material.

3. A glare-eliminating structure according to claim 1 wherein the flexible opaque material from which the shield member is formed is a synthetic resin material.

4. A glare-eliminating structure according to claim 1 wherein the slip-retarding resilient body is formed from a rubber-like material.

5. A glare-eliminating structure according to claim 1 wherein the means for securing the end portion of the flap member to the shield member and the slip-retarding resilient non-metallic body comprise a continuous strip of rubber which extends through said shield member and surrounds the lower portion of said flap member.

6. A glare-eliminating structure capable of adjustable engagement with a temple-bar of conventional eyeglass frames comprising a shield member formed from a flexible opaque material and provided with a plurality of perforations, a flap member extending from the periphery of said shield member which is integrally connected thereto, and a continuous strip of rubber extending through said perforations of said shield member which surrounds said flap member at the lower portion thereof to resiliently secure said flap member to said shield member and to form an aperture capable of receiving a temple-bar.

7. A glare-eliminating structure according to claim 6 in which notches are provided on the flap member at the lower portion thereof where the continuous strip of rubber surrounds the flap member.

References Cited by the Examiner
UNITED STATES PATENTS

| | | | |
|---|---|---|---|
| 947,636 | 1/10 | Degges | 2—13 |
| 2,858,539 | 11/58 | Carlson | 2—13 |

JORDAN FRANKLIN, *Primary Examiner.*